Oct. 20, 1942.　　　R. S. MILLER　　　2,299,486

CHAIN LINK FORMING MACHINE

Filed Nov. 22, 1941　　2 Sheets-Sheet 1

ROBERT S. MILLER
INVENTOR.

BY

ATTORNEY

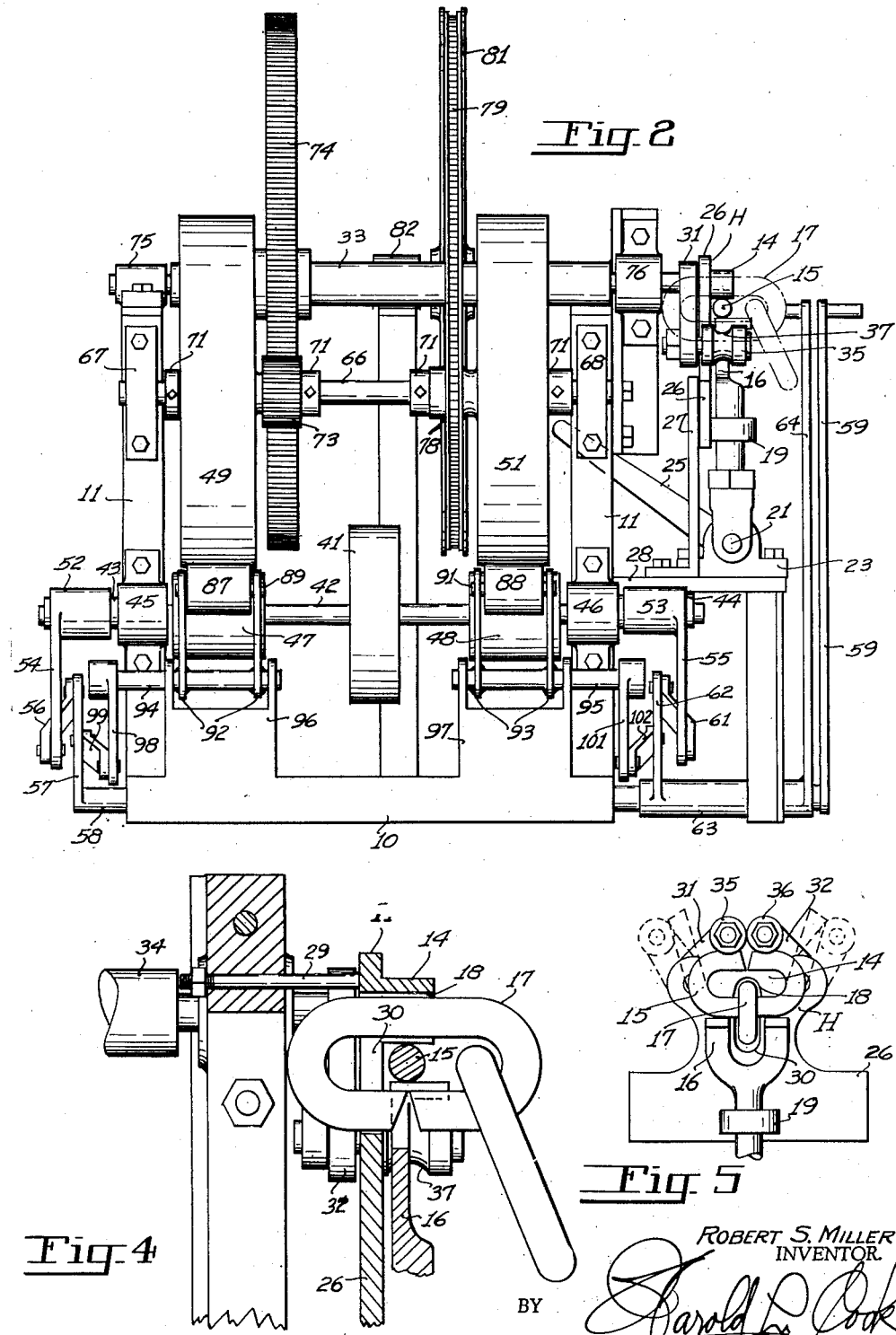

Patented Oct. 20, 1942

2,299,486

UNITED STATES PATENT OFFICE 2,299,486

CHAIN LINK FORMING MACHINE

Robert S. Miller, Portland, Oreg., assignor to Pacific Chain and Manufacturing Company, Portland, Oreg., a corporation of Oregon Application November 22, 1941, Serial No. 420,091

9 Claims. (Cl. 59—27)

The present invention relates to chain manufacture, and more particularly to machines for forming chain links from metal bar stock.

It is an object of the present invention to provide a new and improved machine for forming chain links in a simple and efficient manner.

More specifically, it is an object of the present invention to provide a new and improved machine which is suitable for forming links for heavy duty chains from bar stock of a relatively large diameter.

It is a further object of the invention to provide a new and improved machine for making a chain of a plurality of links, each link being interlinked as it is formed with a previously formed link.

In accordance with an illustrated embodiment of the invention, the machine comprises a forming head including a mandrel and means for bending a length of bar stock around the mandrel into the shape of a link. The mandrel is elongated in shape and the outer circumference thereof corresponds generally to the inner dimensions for the link. A clamp is provided for securing the length of bar stock against the mandrel as it is being formed. The forming head also includes a pair of oppositely rotatable crank arms arranged adjacent the opposite ends of the mandrel for cooperatively engaging with the opposite ends of the bar and bending such ends through an arc substantially equal to 180 degrees around the opposite ends of the mandrel. Power for performing the bending operations is transmitted to each of the crank arms through a suitable drive mechanism connected to the crank shafts, provision being made for permitting adequate and independent control of the power for each crank shaft.

Other objects and advantages of the invention will become apparent from a study of the following specification taken in connection with the accompanying drawings, while the features of novelty characterizing the invention will be pointed out with greater particularity in the appended claims.

Figure 1:
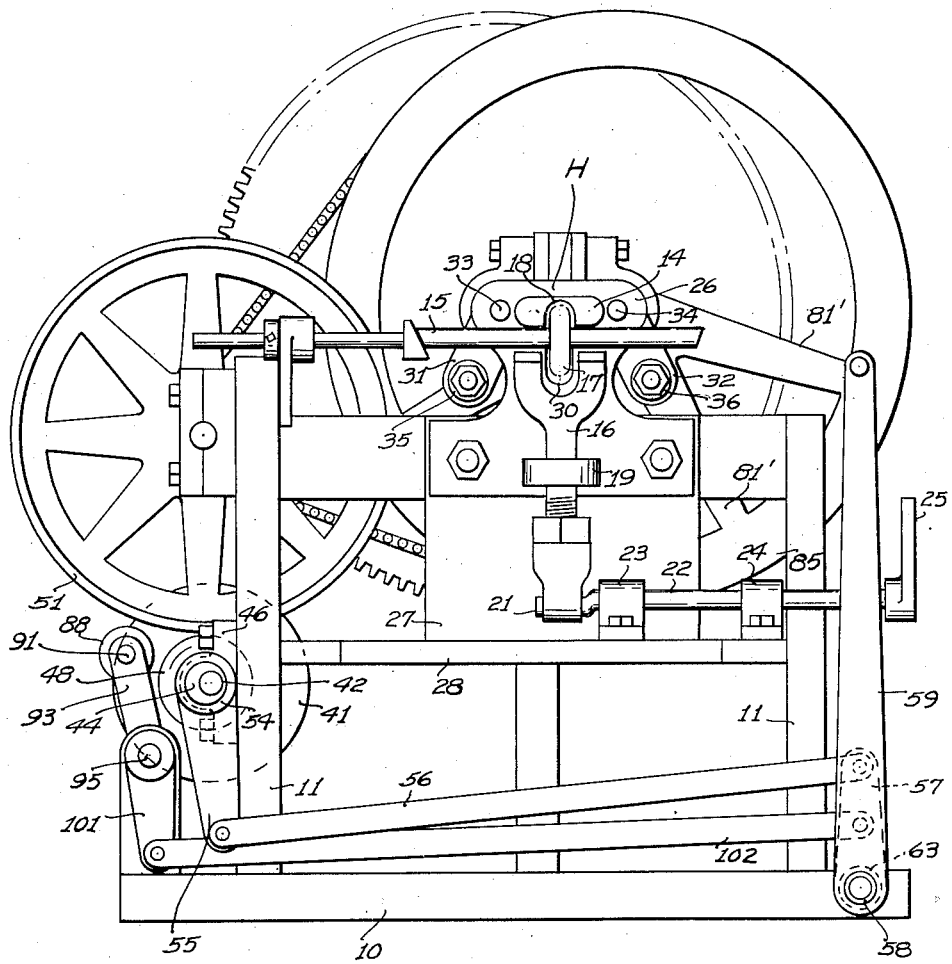
Figure 3:
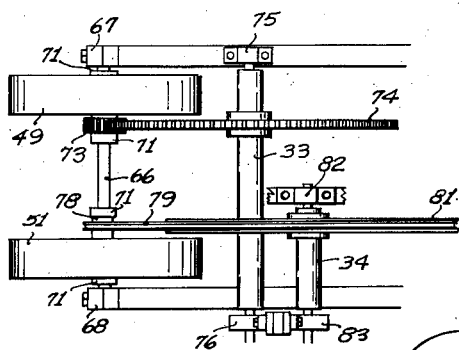

In the drawings, Figure 1 is an end view of the chain link forming machine constructed in accordance with one form of the invention; Figure 2 is a side view of the machine shown in Figure 1; Figure 3 is a partial plan view of the upper portion of the machine illustrating primarily the general relation of certain shafts of the power transmission arrangement; Figure 4 is a cross sectional view of the link forming head of the machine taken along the line 4—4 of Figure 1; and Figure 5 is a fragmentary view of the link forming head of the machine illustrating the cranks in different successive positions from that shown in Figure 1.

Chain link forming machines as have previously been devised for bending lengths of round bar stock into chain links are suitable for handling stock of only relatively small diameter. Such machines are inherently incapable of successfully forming bar stock of the order of greater than one and one-half inches in diameter into uniform chain links, except upon the expenditure of an excessive amount of power, and it is for handling bar stock of the latter range of sizes that the present machine is particularly adapted, though it is to be understood that its field of applicability is not necessarily to be so limited. For performing bending operations upon heavy bar stock it will readily be understood that the component parts of the machine must be constructed relatively ruggedly in order to be able to withstand the forces required, while the power transmission mechanism must be so designed as to be able to transmit power in the required amounts.

The chain link forming machine illustrated in the drawings comprises a supporting structure including a base 10, upright members 11, transverse members 12 connecting the upper ends of the upright members at the opposite ends of the frame, and other miscellaneous elements to be identified as the description proceeds. Mounted at one end of the supporting structure for easy access is a chain link forming head indicated generally at H. The forming head includes an elongated mandrel 14 of a thickness preferably somewhat greater than the diameter of the bar stock from which the chain links are to be formed. The opposite ends of the mandrel are rounded, while the length and height of the mandrel are such as to correspond with the inner dimension for the completed links. A substantially straight section 15 of round bar stock is illustrated as being clamped against the lower side of the mandrel 14 longitudinally thereof by a clamp 16. The bar section 15 is clamped centrally against the mandrel, that is, with substantially equal portions of the bar extending beyond the opposite ends of the mandrel. The bar 15 extends through a previously formed link 17, the upper side of the link 17 being cooperatively received in a notch opening 18 provided in the lower side of the mandrel 14, while the upper end of the clamp 16 is bifurcated to provide a recess into which the lower side of the link 17 may extend. The clamp 16 is arranged for vertical movement within the guide 19, the lower end of the clamp being pivotally connected to a crank end 21 of an operating shaft 22. The shaft 22 is journaled within suitable bearings 23 and 24, and provided with a manual control lever 25 affixed to the outer end thereof. The mandrel 14 is rigidly secured as by welding to a backing plate 26 and to which plate is also secured the clamp guide 19. The plate 26 is rigidly secured relative to the machine frame as through bracket members 27 and 28 and tie bolt 29 (Figure 4). The backing plate 26 is provided with a vertically elongated opening 30 in general alignment with the notch opening 18 in the lower side of the mandrel for cooperatively receiving therethrough the end of the link 17 through which the bar section 15 extends.

The forming head also comprises means adapted to engage with the lower sides of the opposite ends of the bar 15 for bending the opposite ends of bar 15 around the opposite ends of the mandrel 14 through an angle substantially equal to 180 degrees, whereupon the bar ends substantially meet each other on the upper surface of the mandrel. The bar bending means comprises a pair of crank arms 31 and 32 affixed to parallel crank shafts 33 and 34, respectively, which shafts are in turn rotatably journaled adjacent the opposite ends of the mandrel 14, the shaft ends being shown extending through cooperating openings in the backing plate 26. The outermost ends of the crank arms 31 and 32 are provided with right angularly extending rollers 35 and 36, respectively, the rollers being mounted upon the crank arms by suitable bolts extending therethrough. As illustrated more clearly in Figure 2, the rollers 35 and 36 are provided with peripheral grooves 37 for cooperatively receiving the rounded surfaces of the ends of the bar 15 and to insure that the bar ends will not slip from the rollers as they are being bent into the final position. A further reason for grooving the rollers 35 and 36 is to prevent deforming the link as by flattening the outer surface thereof during the bending operation.

The mode of operation of the link forming head may now be described. An end of the previously formed link 17 is first inserted through the openings 18 and 30 in the mandrel and backing plate. The bar section 15, which may first be heated to a red heat to facilitate the bending thereof, is then inserted endwise between the mandrel 14 and the clamp 16, and through the link 17, and is firmly clamped against the lowermost side of the mandrel 14 by the manipulation of clamp 16 through control lever 25. By rotating the crank arms 31 and 32 in opposite directions around the corresponding ends of the mandrel 14, the opposite ends of the bar section 15 will be bent in a manner such as is more clearly indicated in the fragmentary view of Figure 5, the bar ends and cranks being shown in dotted lines in an intermediate position and in solid lines in the final position. The link thus formed interlinks the previously formed link 17 and is then ready for a final welding operation uniting the adjacent bar ends. The welding operations may be deferred until after the entire chain of a predetermined number of links has been formed, and may be carried out according to any suitable welding process. After the links have been bent into the final shape as shown in Figure 5, the crank arms 31 and 32 may be restored to their original position for forming the next succeeding link. The link thus formed may then be removed from the mandrel and an end thereof inserted into the opening 18—30 in lieu of the link 17 and the next successive link for the chain may then be formed in the manner described.

Power may be supplied for operating the crank arms 31 and 32 through any suitable mechanism or power transmission arrangement. In the arrangement shown in the drawings power is adapted to be supplied by a suitable electric motor or other power source (not shown) through a belt to a pulley 41. The pulley 41 is affixed to a shaft 42 which is journaled adjacent opposite ends in bushings 43 and 44 and which bushings are in turn rotatably mounted within bearings 45 and 46 suitably secured to corresponding frame uprights 11. The opposite ends of the shaft 42 are journaled eccentrically within the bushings 43 and 44 so that upon rotation of either one or both of the bushings through a predetermined angle the corresponding end of the shaft is given a component of movement in the vertical plane for reasons to be explained. Fixedly secured to the shaft 42 adjacent the opposite bearings 45 and 46 are friction wheels 47 and 48 which are adapted cooperatively to engage with the rims of corresponding wheels 49 and 51, respectively. By rotation of the bushing 43 through a predetermined angle within bearing 45, the friction wheel 47 may be moved into an engaging relation with the rim of wheel 49, and similarly, upon rotation of the bushing 44 through a predetermined angle within the bearing 46 the friction wheel 48 may be moved into engagement with the rim of wheel 51. Secured to the outer ends of the bushings 43 and 44, respectively, are hubs 52 and 53 having depending arms 54 and 55, respectively, through which angular adjustment of the bushings 43 and 44 may be effected. The arm 54 is connected by a link 56 to an arm 57 secured to one end of a pipe shaft 58 rotatably journaled within the base of the frame structure and to the opposite end of which shaft 58 is secured a manual control lever 59. The arm 55 is connected by a link 61 to an arm 62 which in turn is affixed to a tubular shaft portion 63 arranged concentrically around the end of the shaft 58, the other end of the shaft portion 63 being provided with a manual control lever 64.

The wheels 49 and 51 are journaled for independent rotation upon a shaft 66, the opposite ends of which are rigidly secured by blocks 67 and 68 to corresponding frame uprights 11. To retain the wheels 49 and 51 in a properly spaced relation upon the supporting shaft 66, suitable retaining collars 71 are provided on the opposite sides thereof. Rigidly secured to the hub of the wheel 49 is a pinion 73 meshing cooperatively with a gear wheel 74 of relatively large diameter and which in turn is fixedly secured upon the drive shaft 33 for the crank arm 31. The drive shaft 33 is suitably journaled in bearings 75 and 76 adjacent its opposite ends. Rigidly secured to the hub of the wheel 51 is a chain sprocket 78 about which is trained a chain 79 which also extends around a grooved wheel 81 of a peripheral diameter corresponding generally with that of the wheel 74. The grooved wheel 81 is fixedly mounted upon the shaft 34 for the second crank arm 32, the shaft being rotatably journaled in suitable bearings 82 and 83, respectively, adjacent its opposite ends upon cooperating frame members.

It will be observed that the two wheels 74 and 81 provided upon the shafts 33 and 34, respectively, are of a relatively large diameter as compared with the spacing between the corresponding shafts. The shaft 33 extends through the rim of the wheel 81, the rim of the wheel 81 being secured to its hub by only a few spokes 81' which are all concentrated at one side of the hub. Since the crank arms and hence also the wheels 74 and 81 move through an angle only of the order of 180 degrees, only a corresponding annular space need be provided between the hub and the rim of wheel 81 for the accommodation of the shaft 33. The chain 79 accordingly may be fixedly secured to the rim of the wheel 81 as by a tack weld at a point such as 85 in order to insure that there will be no slippage of the chain 79 relative to the groove of the wheel 81. It will be understood, of course, that the rim of the wheel 81 may be provided with sprocket teeth if desired.

In the operation of the power transmission thus far described, upon movement of the manual control lever 59 to the right, as viewed in Figure 1, the friction wheel 47 attached to the shaft 42 will be moved upwardly into engagement with the cooperating drive wheel 49 and which in turn, through the pinion 73 and the cooperating gear wheel 74, will cause the crank shaft 33 to be rotated in the clockwise direction, as viewed in Figure 1. Due to the mechanical advantage, in the successive speed reductions between the friction wheel 47 and wheel 49, and between pinion 73 and gear wheel 74, the crank arm 31 will be rotated relatively slowly but with a comparatively great force against the end of the bar 15 to bend it around the corresponding end of the mandrel 14. Upon the end of the bar 15 reaching its final position against the upper surface of the mandrel 14 as viewed in Figure 5, the movement of the arm 31 will be arrested due to slippage between the friction wheel 47 and wheel 49 upon the sudden increase in resistance to turning. The operator, by observation of the progress of the movement of the end of the bar toward the upper surface of the mandrel, may ease up on the control lever 64 to inch the crank arm 31 forward and drive the end of the bar 15 into a final position relatively slowly.

By a similar control of the manual lever 64 the friction wheel 48 may be moved into engagement with the cooperating wheel 51 to effect movement of the wheel 81 and the crank shaft 34 in a counter-clockwise direction of rotation to bend the opposite end of bar 15 into engagement with the upper surface of mandrel 14. Rotation of the wheel 81 in the opposite direction with respect to the gear wheel 74 is effected by virtue of the chain drive rather than through a gear drive as in the case of the wheel 74.

Means are provided for effecting a reversal of the direction of rotation of the crank arms 31 and 32 following the completion of a link forming operation. For this purpose idler friction wheels 87 and 88 are rotatably mounted upon shafts 89 and 91, respectively, and supported by bracket arms 92 and 93 which latter arms are rigidly secured to shafts 94 and 95, respectively. The shafts 94 and 95 are rotatably mounted in corresponding suitable supports 96 and 97. Secured to the outer end of the shaft 94 is an arm 98 connected by link 99 to the arm 57 of the manually operable shaft 58. Similarly, the shaft 95 is provided at the outer end with a crank arm 101 which in turn is connected by a link 102 to the arm 62 of the tubular shaft 63. The idler friction wheels 87 and 88 are adapted to be swung into contacting relation between the friction wheels 47 and 49 and between the friction wheels 48 and 51, respectively. In such a contacting relation it will be observed that the idler wheels effect a driving connection therebetween so that the wheels 49 and 51 will be rotated in the opposite direction as compared with the direction of rotation when the friction wheels 47 and 48 are moved into direct contact therewith. It will be observed that the idler wheels 87 and 88 are controlled by the same manual control levers as are used for effecting the forward driving connection between the friction wheels 47 and 48 and the cooperating wheels 49 and 51. For example, referring to Figure 1, movement of the manual control lever in the clockwise direction effects a direct driving connection between the friction wheel 48 and the cooperating wheel 51 whereas movement of the manual control lever in the opposite direction, or counterclockwise, effects movement of the idler wheel 88 into a contacting relation with both the friction wheel 48 and the wheel 51 to effect a reversal of the direction of rotation of the latter.

The machine is described as readily adaptable for making chain links of various sizes merely by substitution of mandrels of different dimensions and correspondingly adjusting the spacing between the parallel shafts 33 and 34 for the crank arms 31 and 32. Adjustment of the spacing between these shafts may readily be effected by varying the thickness of spacer blocks 105 between the bearing 76 for the shaft 33 and the bearing 83 of shaft 34, moving shaft 34 relative to shaft 33. The bearing 76 must remain relatively stationary as regards the frame since the corresponding gear wheel 74 is meshed with the pinion 73. The wheel 81 may be adjustably spaced relative to its driving sprocket 78 merely by the insertion of additional links in the chain connection therebetween. It will readily be understood that as bearing 83 is shifted the bearing 82 for the opposite end of the shaft 34 must be correspondingly adjusted.

Having now described my invention and in what manner the same may be used, what I claim as new and desire to protect by Letters Patent is:

1. A chain link forming machine comprising an elongate form, a support for said form, means for holding a substantially straight bar adjacent one side of said form longitudinally with respect thereto, a pair of cranks mounted for rotation about parallel axes adjacent the opposite ends of said form, means on said cranks for engaging with the opposite ends of said bar on the opposite sides thereof with respect to said form, means for driving said cranks in opposite directions about the opposite ends of said form, and separate control means for individually controlling the said driving means for each of said cranks.

2. A chain link forming machine comprising a mandrel, means for holding a bar of metal stock against one side of said mandrel, a pair of cranks arranged for rotation about parallel axes adjacent the opposite ends of said mandrel, driving means for said cranks, a power transmission including a friction drive connection between said driving means and each of said cranks, and individual control means for separately controlling the driving connection for each of said cranks.

3. A chain link forming machine comprising a mandrel, means for holding a substantially straight bar against one side of said mandrel, means for bending the opposite ends of said bar around corresponding ends of said mandrel, said bending means comprising a pair of cranks arranged for rotation about corresponding ends of said mandrel, driving means for said cranks, a frictional drive connection between said driving means and each of said cranks, independently operable means for controlling the frictional drive connection for each of said cranks, and means operable by said last mentioned means for effecting a reversal of the driving connection between said driving means and said cranks.

4. A heavy duty chain link forming machine comprising a link forming head including a stationary supporting plate, a mandrel rigidly secured to said plate, means slidably mounted on said plate for clamping a bar length against the lower surface of said mandrel, crank arms mounted on the opposite side of said plate with respect to said mandrel and movable in a plane parallel with respect to said plate, ends of said crank arms extending beyond the edge of said plate for engaging with the ends of said bar length, and means for rotating said crank arms toward each other and bending the ends of said bar length around said mandrel.

5. A machine for forming heavy duty chain links, said machine comprising a link forming head including a plate, a mandrel rigidly mounted on said plate, means slidably mounted on said plate for rigidly clamping a bar length against one side of said mandrel and parallel with the surface of said plate, a pair of shafts extending at right angles to said plate on the rear side thereof with respect to said mandrel, the ends of said shafts being journaled in said plate adjacent the opposite ends of said mandrel, a crank arm secured to each of said shafts behind said plate, a roller secured to the end of each of said arms, the axis of said rollers extending parallel to said shafts, said rollers extending beyond the edge of said plate and adapted to engage with the opposite ends of said bar length, and means for rotating said shafts in opposite directions for bending said bar length ends around said mandrel.

6. A machine for forming heavy duty chain links, said machine comprising a link forming head including a plate, a mandrel rigidly mounted on said plate, means for clamping a bar length against one side of said mandrel, a pair of shafts extending at right angles with respect to said plate, the ends of said shafts being journaled in said plate adjacent the opposite ends of said mandrel, crank arms secured to each of said shafts adjacent said plate, end portions of said arms extending parallel to said shafts beyond the edge of said plate and adapted to engage with the opposite ends of said bar length, means for driving said shafts in opposite directions of rotation whereby said bar ends may be bent toward each other around said mandrel.

7. A machine for forming heavy duty chain links comprising a support, a link forming head on said support comprising a mandrel, means for clamping a bar length against one side of said mandrel, a pair of crank shafts on said support extending at right angles with respect to said bar length, crank arms on said shafts adapted to engage with the opposite ends of said bar length for bending said ends around said mandrel, a drive shaft having a pair of spaced friction wheels secured thereto, a second pair of friction wheels rotatably mounted on said support and adapted to be cooperatively engaged by corresponding ones of said first pair of friction wheels, means operatively connecting said crank shafts to said second pair of friction wheels whereby said crank shafts may be driven in opposite directions upon rotation of said second pair of friction wheels in a common direction, and means for effecting selective driving engagement between said corresponding friction wheels.

8. A machine for forming heavy duty chain links comprising a mandrel, means for clamping a bar length against one side of said mandrel, a pair of crank shafts having corresponding ends journaled adjacent opposite ends of said mandrel, crank arms secured to each of said shafts adjacent said mandrel, end portions of said arms extending parallel with said shafts for engaging with opposite ends of said bar length and bending said ends around said mandrel, a drive shaft, a first pair of spaced friction wheels on said drive shaft, a second pair of friction wheels adapted to be cooperatively engaged by corresponding ones of said first pair of wheels, driving connections between said second pair of friction wheels and corresponding ones of said crank shafts, said driving connections being such that said crank shafts are driven in opposite directions upon rotation of said second pair of friction wheels in common directions, and means for effecting selective driving engagement between corresponding ones of said two pairs of friction wheels.

9. A heavy duty chain link forming machine comprising a support, a link forming head on said support including a stationary plate, an elongated mandrel rigidly mounted on said plate, means mounted on said support for rigidly clamping a bar length against one side of said mandrel, a pair of parallel shafts on said support having ends journaled in said plate adjacent opposite ends of said mandrel, crank arms on said shaft adjacent the side of said plate opposite said mandrel, ends of said arms extending parallel with said shafts and beyond the forward surface of said plate, said crank ends adapted to engage with the opposite ends of said bar length and bend said ends around said mandrel, a drive shaft on said support, a pair of spaced friction wheels secured to said drive shaft, a second pair of friction wheels mounted on said support and adapted to be cooperatively engaged by corresponding ones of said first pair of friction wheels, driving connections between said second pair of friction wheels and corresponding ones of said pair of crank shafts, means for effecting selective driving engagement between corresponding ones of said pairs of friction wheels, and a third pair of friction wheels adapted to be moved into cooperative engagement between corresponding ones of said first two pairs of friction wheels to effect reverse rotation of said crank shafts.

ROBERT S. MILLER.